United States Patent [19]

Sawazaki

[11] Patent Number: 5,836,434

[45] Date of Patent: Nov. 17, 1998

[54] CABLE-TYPE CLUTCH DEVICE

[75] Inventor: Hideo Sawazaki, Hamamatsu, Japan

[73] Assignee: Suzuki Motor Corporation, Shizuoka-ken, Japan

[21] Appl. No.: 813,641

[22] Filed: Mar. 7, 1997

[30] Foreign Application Priority Data

Mar. 28, 1996 [JP] Japan .................................. 8-099178

[51] Int. Cl.⁶ .................................................. B60K 23/02
[52] U.S. Cl. ........................................ 192/99 S; 192/112
[58] Field of Search .............................. 192/99 S, 112, 192/99 R, 99 A, 98; 74/502.6

[56] References Cited

U.S. PATENT DOCUMENTS

| | | | |
|---|---|---|---|
| 3,005,530 | 10/1961 | Fawick | 192/99 S |
| 3,277,988 | 10/1966 | Pitner | 192/98 |
| 3,335,833 | 8/1967 | Smirl | 192/99 S X |
| 3,788,438 | 1/1974 | Reno | 192/99 S X |
| 3,795,295 | 3/1974 | Reno | 192/99 S X |
| 4,646,902 | 3/1987 | Maruyamano et al. | 192/112 X |
| 4,821,858 | 4/1989 | Kabayama | 192/99 S X |

FOREIGN PATENT DOCUMENTS

| | | | |
|---|---|---|---|
| 2308668 | 8/1974 | Germany | 192/99 S |
| 57-1454 | 1/1982 | Japan . | |

*Primary Examiner*—Rodney H. Bonck
*Attorney, Agent, or Firm*—Finnegan, Henderson, Farabow, Garrett & Dunner, L.L.P.

[57] ABSTRACT

A clutch device connected by a cable to an actuating pedal. A bulging portion is formed in the lower part of the one piece clutch housing. The bottom end of the clutch release fork and the inner cable of the clutch actuating cable are joined within the bulging area of the clutch housing. The bottom of the bulging area has an opening covered by a removable cap. The cap has a groove for engaging a portion of the edge of the opening and an edge abutting a cable attaching device defining a part of the edge of the opening.

6 Claims, 4 Drawing Sheets

CABLE-TYPE CLUTCH DEVICE

BACKGROUND OF THE INVENTION

1. Field of the Invention

The present invention relates to a cable-type clutch device used in automobiles that have manual shift transmission.

2. Description of Related Art

Manual shift transmissions used in automobiles are operated by first releasing the clutch by stepping on the clutch pedal, so that the shift lever can be manipulated to select the proper gear. Once the proper gear is selected, the clutch is gradually engaged by releasing the clutch pedal, and torque is transmitted from the engine to the transmission. The driver thus disengages the engine from the transmission by pressing the clutch pedal, then reengages by gradually releasing the pedal.

A typical clutch structure will be described by referring to FIG. 1. The clutch device 1 has a clutch housing 2. One face of the clutch housing faces the engine (not shown), and the engine's crank shaft 3 is placed at the center of that face. A flywheel 5 is attached to this crank shaft by bolts 4. A bearing 6 is mounted in a hole 5a which is provided in the center of the flywheel 5. The bearing 6 supports the extremity of input shaft 7 of the transmission (not shown).

When the flywheel 5 and the input shaft 7 are joined, torque from the engine is transmitted to the transmission. To achieve this, the clutch mechanism includes the following components. A clutch disk 8 in close proximity to a face of the flywheel 5 is joined to the shaft 7 by a spline. The clutch disk is coated with a frictional material, and faces the flywheel on one side, and a pressure plate 11 on the other.

The pressure plate is ring shaped, and has protrusions 11a on the face opposite to the clutch disk. A diaphragm spring 12 presses on these protrusions in such a way that the pressure plate forces the clutch disk's frictional material to contact the flywheel. The diaphragm spring 12 is supported by the flywheel 5. Through this structure, the crank shaft 3, the flywheel 5, and the clutch disk 8 rotate as a single unit, when the clutch is engaged. Since the transmission input axle 7 is connected through a spline to the clutch disk 8, it will also rotate.

A release fork 14 is located within the clutch housing. The top or upper end of the release fork is pivotally supported by a support 15 that protrudes into the clutch housing. A hole 14a is provided in the release fork to provide an opening through which tube 2a of the clutch housing can fit. A release bearing 16 is placed in sliding contact around the exterior of the tube 2a, and is allowed to move along tube 2a. One face of the release bearing 16 is in contact with release fork 14, and the other face is in contact with diaphragm spring 12.

An opening 2b is provided in the lower part of the clutch housing and a dust boot is mounted there to prevent grime and water from entering. The lower part of release fork 14 perforates the dust boot, and extends outside the clutch housing. Linking component 20 connects the lower end of the release fork 14b to the inner cable 19 of the clutch release cable. The outer section 21 of the clutch cable penetrates the clutch housing through hole 2d of the housing. Adjusting screw 22 fastens the cable attaching device 2c to the clutch housing. Return spring 23 is connected to the release fork and to the clutch housing, and urges the fork away from the diaphragm spring.

The clutch illustrated in FIG. 1 is in an engaged state, when the driver is not pressing on the clutch pedal. In this state, spring 23 pulls the release fork 14 toward the housing, and the diaphragm spring 12 is free to push pressure plate 11 against clutch disk 10, which in turn is pressed in frictional contact with flywheel 5. Thus, rotation of crank shaft 3 is transmitted to the transmission input shaft 7.

When the driver presses the clutch pedal, the clutch inner cable 19 pulls the lower end 14b of the release fork 14 away from the housing. The resistance of spring 23 is overcome, and release fork 14 pivots on support 15, and pushes release bearing 16 against the center of diaphragm spring 12. When the center of the diaphragm spring 12 is so pressed, the outside of the spring releases its pressure on pressure plate 11, which in turn lets clutch disk 10 separate from flywheel 5. As a result, crank shaft 3 and transmission input shaft 7 are no longer connected.

In the conventional clutch device as described, an opening 2b is provided at the bottom of the clutch housing to let the release fork lower end 14b protrude out of the housing. This opening requires a dust boot to prevent the entry of contaminants, while allowing movement of the clutch release fork 14. Boot 17 must be flexible, properly sized, and able to withstand fatigue. The boot is located near the ground, so it must also sustain impacts from debris and rocks, while not restricting or impeding the movement of the release fork passing through its center. Japanese Published Patent 57-1454 describes a clutch apparatus having just such a problem.

In view of the foregoing problems, there is a need for a cable-type clutch device which avoids the problems associated with the boot used in the prior art.

SUMMARY OF THE INVENTION

Accordingly, the present invention is directed to a cable-type clutch device, which substantially obviates one or more of the problems due to the disadvantages and limitations of the prior art.

The advantages of the invention include obviating the need for a dust boot which is flexible enough to allow movement of the protruding clutch release fork, able to withstand fatigue caused by the motion of the clutch release fork, and resistant to damage due to impact with debris. Other advantages include minimizing the size and weight of the clutch housing, and facilitating access to the linkage between the inner actuating cable and the clutch release fork.

Additional features and advantages of the invention will be set forth in the description which follows, and in part will be apparent from the description, or may be learned by practice of the invention. The objectives and other advantages of the invention will be realized and attained by the apparatus particularly pointed out in the written description and claims hereof as well as the appended drawings.

To achieve these and other advantages and in accordance with the purpose of the invention, as embodied and broadly described herein, the invention is a cable-type clutch device with a housing having opposite face portions for mounting to an engine and transmission respectively, said housing having a central portion for mounting an input shaft and flywheel to rotate about an axis extending between the opposite face portions. The housing has upper and lower portions. A cable attaching assembly having a stationary outer cable and an inner cable movable within the outer cable is placed adjacent the lower portion of the housing. The clutch housing has a bulging portion extending below the inner cable in the lower part of the housing, and an opening is defined at the bottom of the bulging portion. A removable cap covers the opening. A clutch release fork with a top end pivotally mounted in the upper end of the housing and a lower end connected to the inner cable within the bulging area is also placed in the housing.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

DESCRIPTION OF THE PREFERRED EMBODIMENT

Reference will now be made in detail to the present preferred embodiment of the invention, wherein like reference numbers refer to like parts throughout the drawings where possible, and an example of which is illustrated in the accompanying drawings. Certain components described in connection with FIG. 1, which are common to the preferred embodiment, are omitted in the description of the preferred embodiment for the sake of brevity.

In accordance with the invention, a cable-type clutch device has a housing with a bulging portion extending outwardly from the lower part of the clutch housing. An outer cable is mounted to the clutch housing and an inner cable extends in the bulging portion. A clutch release fork is connected to the inner cable within the bulging area, and the bottom of the bulging portion has an opening.

Figure 1:
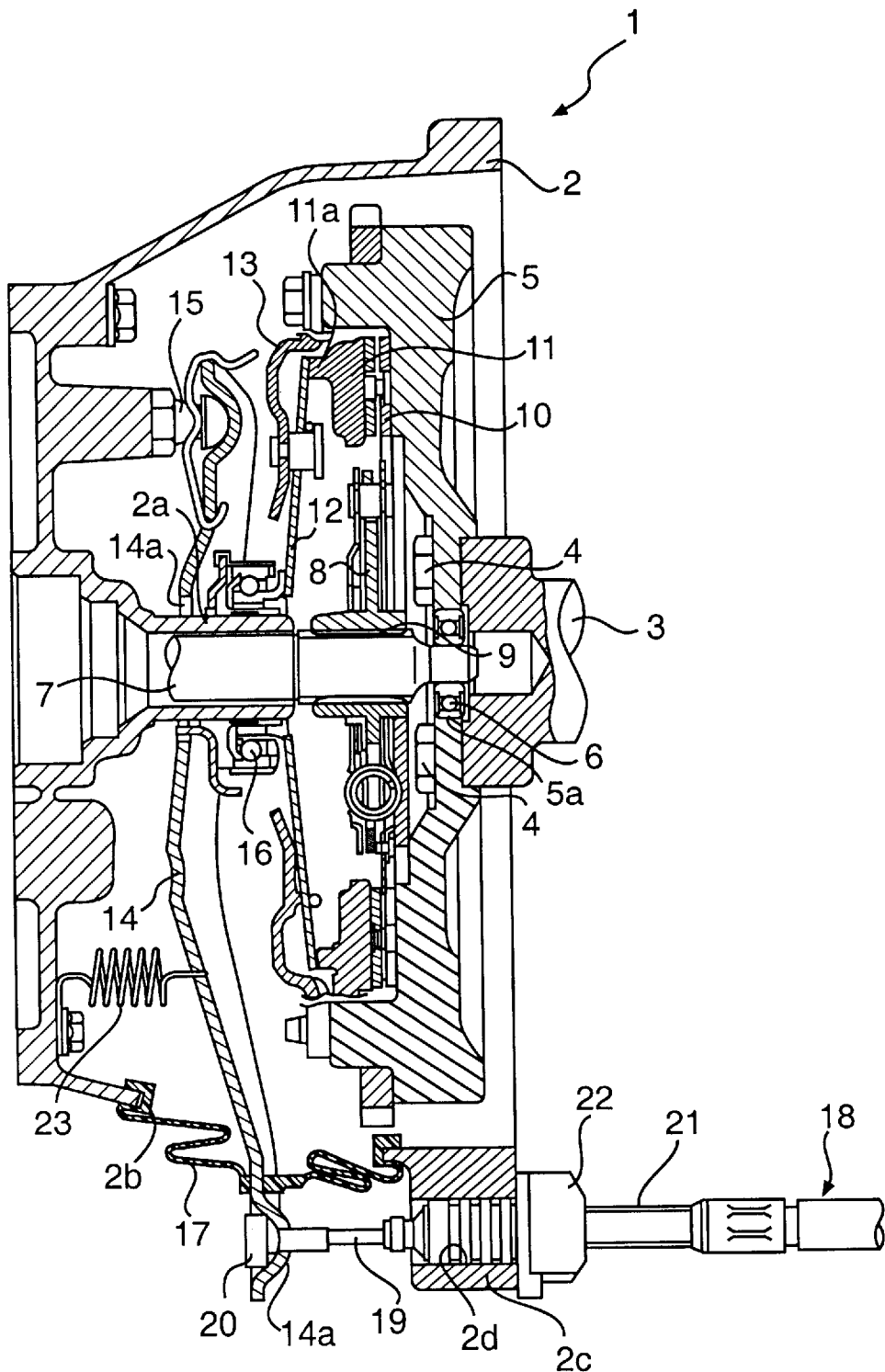
FIG. 1 is a longitudinal sectional view in elevation of a conventional clutch device.
Figure 2:
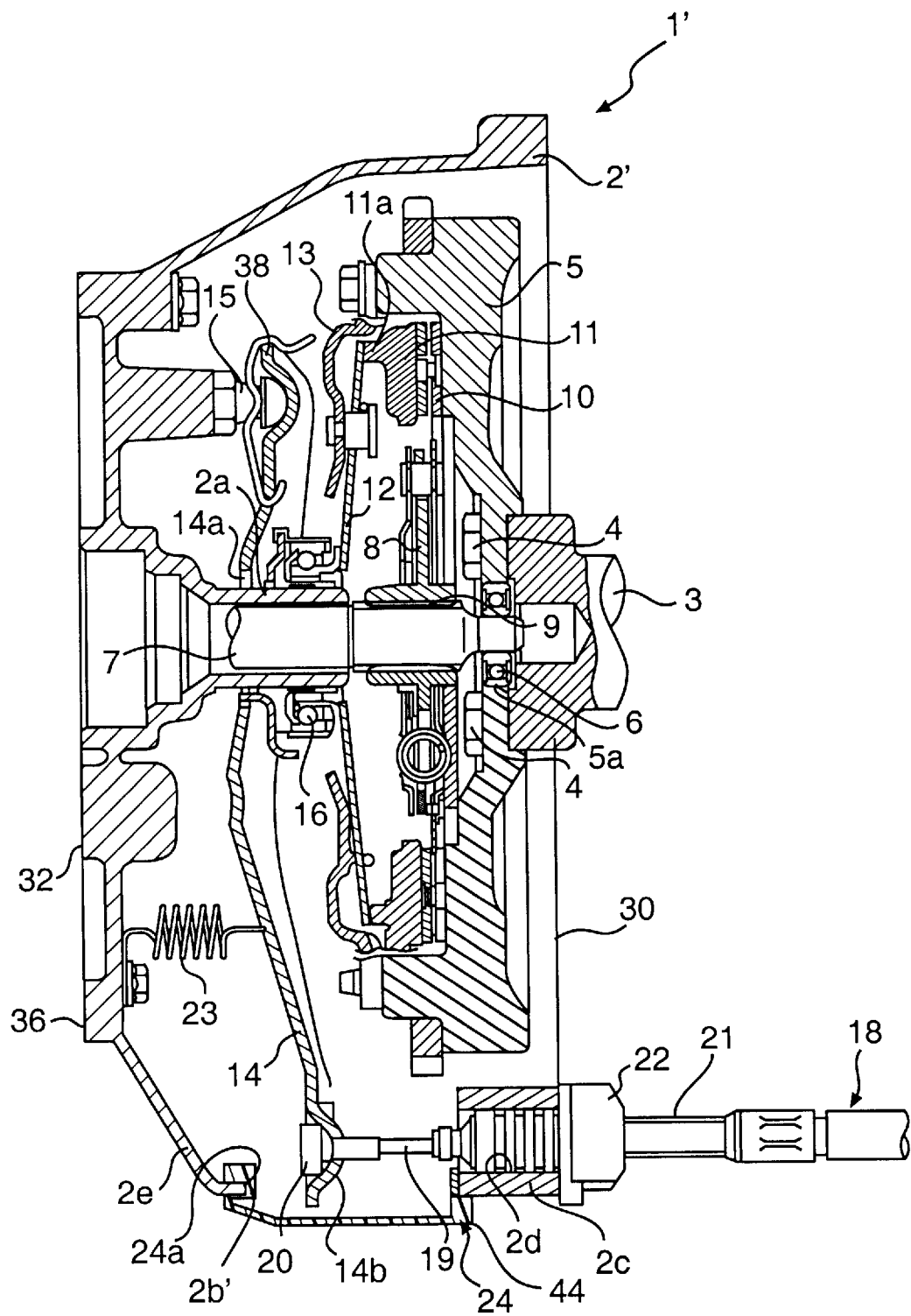
FIG. 2 is a longitudinal sectional view in elevation of one embodiment of the present invention.

As herein embodied and referring to FIG. 2, a housing 2' for a cable-type clutch 1' has a first face portion 30 and a second face portion 32 opposite to the first face portion for respectively mounting to an engine and a transmission housing (not shown). The housing 2' has a central portion for mounting the input shaft 7 and the flywheel 5, as well as the other components previously described. The housing 2' has a bulging portion or area 2e that extends outwardly beneath a lower part 36 of the clutch housing. The clutch release fork 14 has a top end 38 pivotally attached to the inwardly protruding support 15 near an upper end of the housing 2', and a lower end 14b positioned within the bulging portion 2e. As described in connection with FIG. 1, a cable attaching device 2c is fastened in the housing adjacent face 30 by an adjusting screw 22. The clutch cable generally referred to as 18, is comprised of a movable inner cable 19 and an outer cable 21, and is inserted in the housing through hole 2d of the device 2c. The clutch cable is attached by its outer cable 21 to the cable attaching device 2c, and by the tip of inner cable 19 to the lower end 14b of the release fork 14, using linking component 20. The bulging portion 2e terminates adjacent a bottom portion in substantially the same plane as the lower peripheral edge 2d. (See line a of FIG. 4.) An opening 2b ' is located at the bottom of the bulging portion 2e.

In accordance with the present invention, the opening in the bottom of the bulging portion is generally rectangular in configuration and has a longitudinal dimension which extends in the direction of movement of the inner cable. A cap of elastic material is removably fastened to the bottom of the bulge to cover the rectangular opening, and has a central raised portion that extends slightly below the edges of the rectangular opening.

Figure 3:
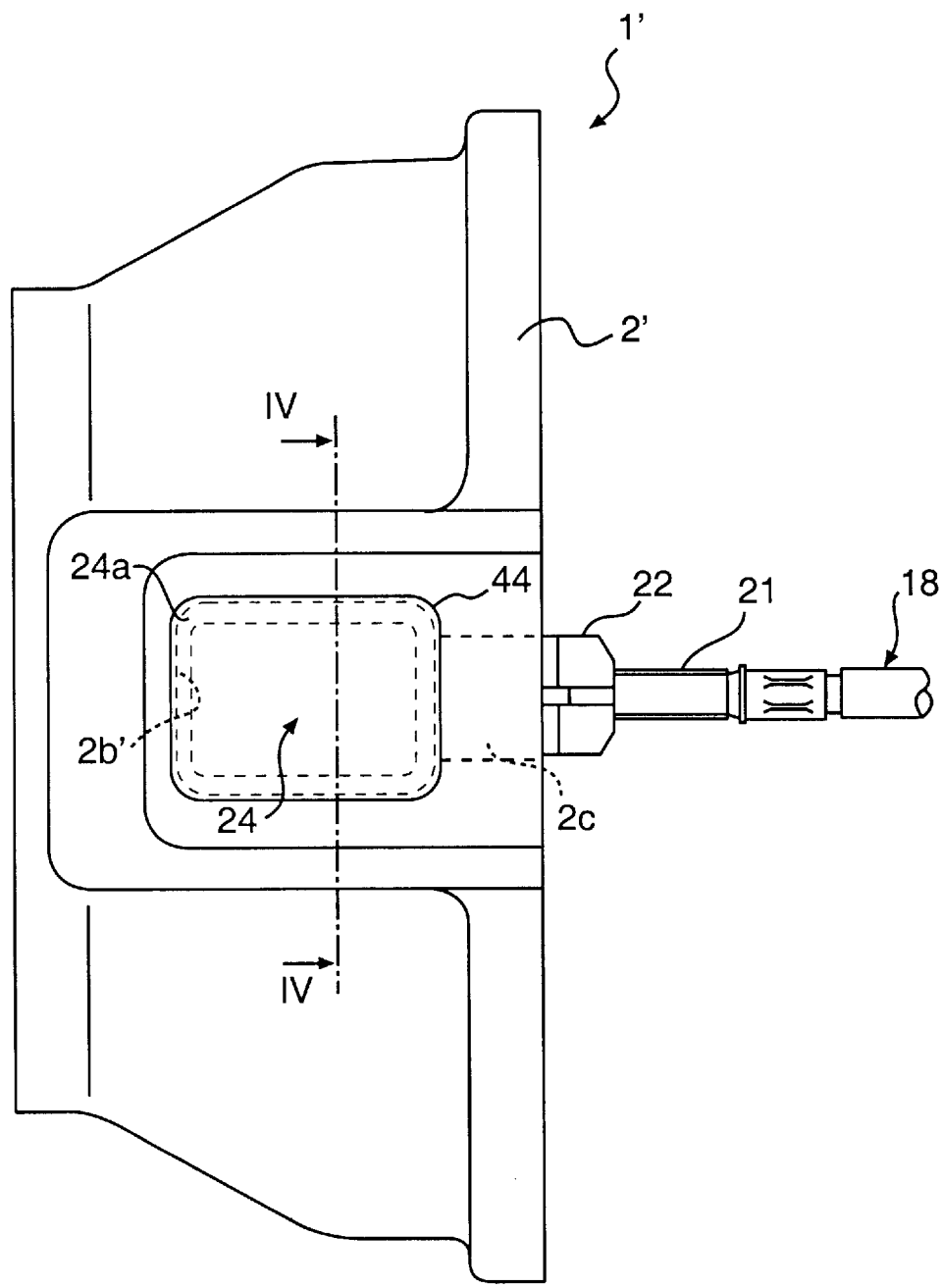
FIG. 3 is a fragmentary bottom plan view of the embodiment of FIG. 2.
Figure 4:
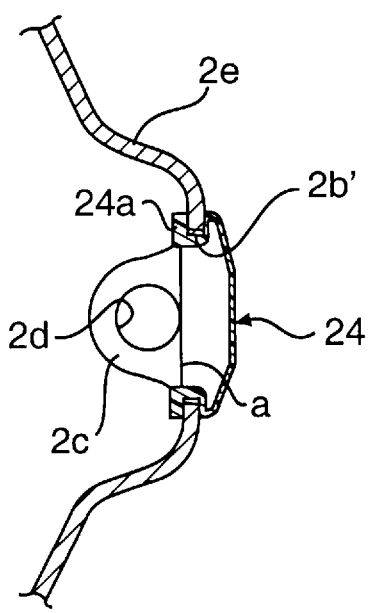
FIG. 4 is a fragmentary cross sectional view taken along line IV—IV in FIG. 3 and looking in the direction of the arrows.

As herein embodied and referring to FIGS. 2–4, an opening 2b 'has a generally rectangular shape with a longitudinal length dimension extending in the direction of movement of the inner cable 19. A cap 24, which is preferably rectangular, is made of a resilient elastic plastic or rubber material, and has a peripheral groove 24a that extends along both longitudinal length edges of the opening and along one of the width edges. The remaining peripheral edge 44, along the width dimension adjacent the cable attaching device 2c, is without a peripheral groove and preferably abuts the opposing surface of the cable attaching device 2c. Thus, the outer edge of the cap 24 is configured so that the part of the cap facing the cable attaching device 2c is eliminated resulting in the cap peripheral groove being shaped like a backwards C. The cap is attached by being inserted in the opening 2b ' of the bulging portion 2e of the clutch housing 2', via its backward C shaped groove 24a.

In terms of the clutch device essential functions, there are some aspects of the embodiment structured in ways that are no different than those explained in connection with FIG. 1. Namely, when a driver is not stepping on the clutch pedal, the engine's crankshaft 3 and transmission input shaft 7 are joined such that motive power is transmitted. When the clutch pedal is depressed, the inner cable 19 is pulled, the clutch release fork 14 moves, and the pressure plate 11 separates from flywheel 5.

The long rectangular opening 2b ' oriented in the direction in which the inner cable 19 and the clutch release fork 14 move, facilitates the disconnection and adjustment or inspection of the inner cable 19 relative the clutch release fork 14. This is accomplished merely by removing the cap 24. The configuration of the cap 24 whereby the central part of the cap has a raised portion or plateau, permits the lower end 14b of the clutch release fork 14 to function with the cap in place. This minimizes the required size of the clutch housing 2'. Also, because a part of the periphery of cap 24 facing the clutch cable attaching device 2c is without the peripheral groove 24a, moving the cap into and out of the opening 2b can be accomplished easily and securely. As this invention is a cable-type clutch device built as above described, it is possible to have a structure which does not require a dust boot mounted on a lower part of the housing. Thus, the many problems caused by a dust boot are eliminated in a single stroke. Further, because of the shape of the cap 24, minimum ground clearance can be kept high, minimizing the impact of flying stones. Still further, the cap can be attached to the housing by merely fitting the edge of the opening in the peripheral groove. Thus, the handling of components is improved relative to structures that use dust boots.

It will be apparent to those skilled in the art that various modifications and variations can be made in the structure of the present invention without departing from the spirit or scope of the invention. Thus, it is intended that the present invention cover the modifications and variations of this invention provided they come within the scope of the appended claims and their equivalents.

What is claimed is:

1. A cable-type clutch device comprising:

a clutch housing having opposite face portions for mounting to an engine and transmission respectively, said clutch housing having a central portion for mounting an input shaft and flywheel to rotate about an axis extending between the opposite face portions, said clutch housing having an upper and a lower portion;

a cable attaching device, including an outer cable mounted to the housing adjacent one of the opposite faces at a housing bulging portion extending below the lower portion of the housing, and an inner cable within the outer cable;

said housing bulging portion having a bottom below the inner cable, the bottom having an opening;

a removable cap mounted at the bottom of the bulging portion and covering the opening; and a clutch release fork having a top end pivotally mounted within the upper portion of the housing and having a lower end extending beyond the lower portion of the housing and connected to the inner cable within the bulging portion of the housing;

the housing bulging portion having a width greater than a width of the clutch release fork, and smaller than a width of the housing lower portion.

2. The clutch device of claim 1 wherein the opening in the bulging portion is rectangular in configuration with the longitudinal dimension extending in the direction of movement of the inner cable.

3. The clutch device of claim 2 wherein the removable cap is of an elastic material and has a central raised portion extending below and spaced from the lower end of the clutch release fork.

4. The clutch device of claim 2 wherein the raised portion of the cap is a plateau.

5. The clutch device of claim 1 wherein the removable cap is of an elastic material and has a central raised portion extending below and spaced from the lower end of the clutch release fork.

6. A cable-type clutch device comprising:

a clutch housing having opposite face portions for mounting to an engine and transmission respectively, said clutch housing having a central portion for mounting an input shaft and flywheel to rotate about an axis extending between the opposite face portions, said clutch housing having an upper and a lower portion;

a cable attaching device, including an outer cable mounted in the housing adjacent one of the opposite faces at the lower portion of the housing, and an inner cable within the outer cable;

said housing having a bulging portion extending below the lower portion of the housing with a bottom below the inner cable, the bottom having a rectangular opening having a longitudinal dimension extending in the direction of movement of the inner cable;

a removable cap mounted at the bottom of the bulging portion and covering the opening; and a clutch release fork having a top end pivotally mounted within the upper portion of the housing and having a lower end connected to the inner cable within the bulging portion of the housing;

wherein the bottom of the bulging portion has edge surfaces defining opposite longitudinal edges of the rectangular opening and a width edge surface connecting said opposite longitudinal edge surfaces, and the cable attaching device defining at least a portion of an opposite width edge; the cap having a peripheral groove receiving the width edge surface and the opposite longitudinal edge surfaces, and having an edge abutting the opposite width edge partially defined by the cable attaching device.

\* \* \* \* \*